United States Patent
Giancarlo et al.

(10) Patent No.: US 9,349,366 B2
(45) Date of Patent: May 24, 2016

(54) SYSTEMS AND METHODS FOR MANAGING AN EMERGENCY SITUATION

(71) Applicants: Phillip A. Giancarlo, Lebanon, CT (US); David B. Benoit, West Hartford, CT (US); Richard M. Borden, West Hartford, CT (US); Keven J. Busque, Manchester, CT (US); Kyle K. Busque, Bolton, CT (US)

(72) Inventors: Phillip A. Giancarlo, Lebanon, CT (US); David B. Benoit, West Hartford, CT (US); Richard M. Borden, West Hartford, CT (US); Keven J. Busque, Manchester, CT (US); Kyle K. Busque, Bolton, CT (US)

(73) Assignee: WEARSAFE LABS LLC, Hartford, CT (US)

( * ) Notice: Subject to any disclaimer, the term of this patent is extended or adjusted under 35 U.S.C. 154(b) by 51 days.

(21) Appl. No.: 13/917,037

(22) Filed: Jun. 13, 2013

(65) Prior Publication Data
US 2013/0339019 A1 Dec. 19, 2013

Related U.S. Application Data

(60) Provisional application No. 61/659,147, filed on Jun. 13, 2012.

(51) Int. Cl.
*G10L 21/00* (2013.01)
*G10L 15/04* (2013.01)
*G10L 15/26* (2006.01)
*G10L 25/48* (2013.01)

(52) U.S. Cl.
CPC .............. *G10L 15/04* (2013.01); *G10L 15/26* (2013.01); *G10L 25/48* (2013.01)

(58) Field of Classification Search
CPC ....... G01S 1/68; G01S 5/0226; G01S 13/878; G06F 21/554; G06F 1/163; G10L 17/00; H04W 4/22; H04W 76/007; H04W 60/04
USPC .............. 704/251, 270, 273, 270.1, 271, 272, 704/274; 340/573.1, 825.49
See application file for complete search history.

(56) References Cited

U.S. PATENT DOCUMENTS

| | | | |
|---|---|---|---|
| 2004/0070515 A1* | 4/2004 | Burkley et al. | 340/825.49 |
| 2005/0234727 A1* | 10/2005 | Chiu | 704/270.1 |
| 2007/0057798 A1* | 3/2007 | Li et al. | 340/573.1 |
| 2008/0172232 A1* | 7/2008 | Gurley | 704/251 |
| 2010/0161338 A1* | 6/2010 | Tofighbakhsh | 704/273 |
| 2014/0370836 A1 | 12/2014 | Gladstone | |
| 2014/0370837 A1 | 12/2014 | Gladstone | |

* cited by examiner

*Primary Examiner* — Huyen Vo
(74) *Attorney, Agent, or Firm* — John M. Behles

(57) ABSTRACT

Systems and methods for managing an emergency situation are provided herein. According to some embodiments, the present technology may related to a security system and method for monitoring, detecting, and providing notification and/or response measures in response to an emergency situation regarding a user.

15 Claims, 12 Drawing Sheets

SYSTEMS AND METHODS FOR MANAGING AN EMERGENCY SITUATION

CROSS-REFERENCE TO RELATED APPLICATION(S)

This Non-Provisional U.S. Patent Application claims the priority benefit of U.S. Provisional Application Ser. No. 61/659,147, filed on Jun. 13, 2012, which is hereby incorporated by reference herein in its entirety including all references cited therein.

BACKGROUND OF THE INVENTION

Field of the Invention

The present invention relates in general to emergency response systems and methods. More particularly, but not by way of limitation, the present technology may comprise systems and methods for monitoring, detecting, and providing notification and/or response measures in response to an emergency situation regarding a user.

SUMMARY OF THE INVENTION

According to some embodiments, the present disclosure may be directed to a method for activating a response measure on an electronic device. The electronic device comprises a processor and a memory for storing logic. Furthermore, the processor executes the logic to perform a method comprising: (a) analyzing words or phrases spoken by a user using speech recognition; (b) determining if the user has spoken a safe word from the analyzed words or phrases, the safe word indicating that the user is in an emergency situation; and (c) activating a predetermined response measure on the electronic device if the user has spoken a safe word.

According to some embodiments, the present disclosure may be directed to a method for activating a response measure on an electronic device. The electronic device comprises a processor and a memory for storing logic. The processor executes the logic to perform a method comprising: (a) monitoring any of a location, an orientation, or a position of the electronic device; (b) detecting a sudden or a threshold exceeding change to any of the location, the orientation, or the position of the electronic device; and (c) activating a predetermined response measure on the electronic device if a sudden or threshold exceeding change is detected.

According to some embodiments, the present disclosure may be directed to an electronic device configured to activate a response measure in response to an emergency event. The electronic device comprises: (a) a processor; and (b) a memory for storing logic. The processor executes the logic to: (i) analyze words or phrases spoken by a user using speech recognition; (ii) determine if the user has spoken a safe word from the analyzed words or phrases, the safe word indicating that the user is in an emergency situation; and (iii) activate a predetermined response measure on the electronic device if the user has spoken a safe word.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be understood that the invention is not necessarily limited to the particular embodiments illustrated herein.

DETAILED DESCRIPTION OF EXEMPLARY EMBODIMENTS

Figure 1:
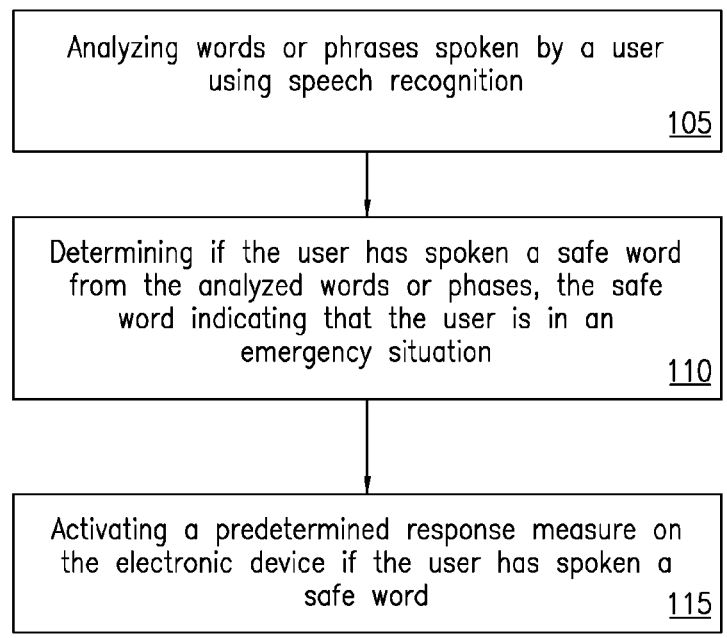
FIG. 1 is a flowchart of an exemplary method for activating a response measure on an electronic device in response to an emergency situation.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

Before explaining the presently disclosed and claimed inventive concept(s) in detail by way of exemplary embodiments, drawings, and the like, it is to be understood that the present disclosure is not limited in its application to the details of construction and the arrangement of the components set forth in the following description or illustrated in the drawings. The present disclosure is capable of other embodiments or of being practiced or carried out in various ways. As such, the language used herein is intended to be given the broadest possible scope and meaning; and the embodiments are meant to be exemplary—not exhaustive. It is to be understood that the phraseology and terminology employed herein is for the purpose of description and should not be regarded as limiting. Unless otherwise required by context, singular terms may include pluralities and plural terms may include the singular.

The present disclosure generally relates to a security system and method to monitor, detect, and provide notification and/or response measures in response to an emergency situation for a user. By way of example, a user having an electronic device (e.g., a smartphone, laptop, e-reader, and so forth) may suddenly find herself in an emergency situation (e.g., a mugging, a robbery, an injury, an automobile accident, and so forth) where she is otherwise unable to access or use her electronic device in its normal manner to notify or alert others to the emergency. For example, in an emergency situation involving a robbery, the user cannot use her cellphone to call the authorities without the robber observing her and possibly retaliating against her.

In accordance with certain aspects of the present disclosure, the user in this situation may simply speak predetermined word(s) or phrase(s) wherein the electronic device then automatically launches one or more response measures in response (e.g., launches certain applications, transmits/receives messages, records and transmits audio/video/location data, and so forth). The electronic device may begin recording audio, video, and/or data indicative of the geographic location of the electronic device and then transmit said information to one or more recipients (police, fire, ambulance, family, friends, and so forth) to alert them to the emergency, and if appropriate, initiate a response. In effect, the presently disclosed security system and method turns a user's electronic device into a personal security and protection system.

Generally, the security system and method may include an electronic device ("device") operating in a network or interconnected environment and including software or logic instructions ("security program") residing thereon and being configured to carry out or perform at least a portion of the disclosed inventive concepts. Certain aspects may provide for a security program on the electronic device that continuously monitors for an emergency situation for the user of the electronic device and, once an emergency situation is detected, triggers or otherwise launches predefined programs, functions, steps, or other response measures on the electronic device in order to monitor, mitigate, and/or initiate a response to the emergency. Certain aspects may provide for the electronic device to include a microphone and a speech recognition program and to monitor for and detect the emergency situation via receiving and analyzing the words being spoken by the user of the electronic device. When the user speaks a predefined word or phrase ("safe word"), the response measures may be initiated. That is, the electronic device may have a security program and/or other application (e.g., a speech recognition program) that constantly listens for the user to speak the safe word, utilize the voice recognition program to determine whether the user has spoken the safe word, and, if so, launch the predetermined steps or functions in response. The speech recognition program may be implemented as an integral component or module of the security program or as a separate program residing on the electronic device wherein the security program may be in communication with the speech recognition program.

Certain aspects of the security system and method may provide for the electronic device to carry out the predetermined steps or functions in the background such that a person viewing or even using the electronic device would not be aware of the response measures being carried out. This mode of operation may be referred to as stealth response mode. That is, the security program on the electronic device may execute an emergency response, which may include executing various functions on the electronic device that would normally cause some outwardly observable effect, such as screen illumination, haptic feedback, or audible indications. In stealth mode, the security program may disable any settings on the electronic device that provide these types of feedback.

For example, the security system and method may be adapted such that the electronic device or an application server may automatically dial an emergency 911 call in response to detecting the emergency wherein the display, keypad, and so forth, on the electronic device does not activate, light up, or otherwise display any information indicating that the call is being placed. Other aspects may provide for the electronic device to automatically mute a speaker on the electronic device when placing the emergency 911 call so as to again operate in the background without indicating to others that security measures have been implemented. When the security system and method is implemented on an electronic device other than a smart phone, certain aspects may provide for activating a webcam, microphone, and so forth, in the background on the electronic device, but again without in any way alerting others to the response measures being taken, e.g., not activating the LED light associated with the webcam, without changing the information being displayed on the monitor, and so forth Other aspects of the security system and method may include the electronic device having location and/or position based sensors, transducers, and so forth. In this situation, the emergency situation may be detected based on sensing sudden changes in the location and/or position of the electronic device. At least a part of the response measures may include the automatic and/or periodic transmission of data indicative of the geographic location, movement, lack of movement, and so forth, of the electronic device to predetermined recipients. In the case wherein the emergency situation involved theft or loss of the user's electronic device, response measures transmitting the location of the electronic device, for example, may aid in locating the thief and/or recovery of the electronic device.

Other aspects of the security system and method may also provide for the electronic device to include an accelerometer, an inertial navigation system, GPS location based sensing device, and so forth, and also logic instructions receiving inputs from said sensing devices wherein the electronic device detects an emergency based on a sudden and/or substantial change to the location, orientation, and/or position of the electronic device. A substantial change in location, orientation, and/or position of the electronic device is referred to as a "threshold exceeding" change in any of these parameters.

Once the emergency situation has been detected, based on the inputs from the sensing devices meeting and/or exceeding predetermined levels, the predetermined steps or response measures are again initiated in response. Further, the security program and method may, using data received from the accelerometer or other sensing devices, track the movements and/or lack of movement of the electronic device to detect an emergency and, once an emergency has been detected, track the movements of the electronic device. The movements and/or lack of movements of the electronic device may then be transmitted to predetermined recipients as part of the predetermined response measures. Other aspects may provide for the electronic device to include position-based hardware (e.g., GPS) and/or software using location based algorithms based on the location of the electronic device proximate to the nearest access point (e.g., cell phone tower, WiFi access point, internet service provider, and so forth), and the like, such that the electronic device is again configured to determine, store, and/or transmit data indicative of its geographic location as part of the response measures.

Certain aspects may also provide for the electronic device to include a plurality of sensors designed to gather information indicative of the environmental conditions surrounding the electronic device, e.g., a camera to capture and store photographic images and/or video; a microphone to capture and store audio; a light sensor to sense and record the ambient light level around the electronic device; and the like. Data from such sensors can be captured, stored, and/or transmitted to predetermined parties as a part of the response measures.

The predetermined steps, functions, or response measures initiated in response to the detection of an emergency using the presently disclosed security system and method may include a variety of hardware, logic instructions, applications, programs, modules, and so forth residing and/or operating on the electronic device or remotely on an application server and, individually or collectively being adapted to monitor the emergency situation, mitigate the emergency, and/or initiate a response to the emergency. Exemplary response measures may include, but are not limited to, placing an emergency call to 911; determining an initial location of the electronic device when the emergency is detected and optionally, at predetermined intervals thereafter, transmitting said location(s), or data indicative of said location, to one or more predetermined recipients; activating a microphone and/or camera on the electronic device to capture, record, and/or transmit audio and/or video; automatically transmitting one or more emergency messages to predetermined recipient (s) via standard Short Messaging Service (SMS), Enhanced Messaging Service (EMS), Multimedia Messaging Service (MMS), Instant Message (IM), email message, or combinations thereof, wherein the messages may include text, audio, video, and/or other data, e.g., data indicative of the location of the electronic device.

As described above, certain aspects may provide for the response measure wherein the electronic device or an application server automatically places one or more calls to predetermined recipients upon detecting an emergency. The call may be placed to an emergency 911 service, family member(s), friends, and the like. Certain aspects may provide for wherein the security program may further, when placing a call, include identification data that is transmitted to the call recipient wherein the identification data permits the recipient to immediately recognize that the user of the electronic device is in an emergency situation and also that the user may not be able to use the electronic device in its normal manner (e.g., the user cannot speak directly to the call recipient). The call recipient, recognizing the emergency situation based on the identification data may understand that information regarding the emergency situation would be obtained from monitoring any audio, video, location, and so forth, information being received from the electronic device. Exemplary identification data may reflect the name of the security program operating on the electronic device, data identifying the user of the electronic device, and so forth Other identification data may include a short, emergency message having predetermined text, e.g., "EMERGENCY—PLEASE HELP." The identification data appearing to the recipient(s) (e.g., showing up on the recipient's caller-ID) may indicate to the recipient that the user of the electronic device is unable to use the electronic device in its normal manner (e.g., the user cannot use a Smartphone to place a call) and also that the user is in an emergency situation. In one example, the security program residing or operating on the electronic device may be named "Calleez" wherein the Calleez is adapted to transmit "Calleez" as the identification data, or at least a portion of the identification data, to the call recipient to alert the recipient to the emergency. A 911 operator may see the name "Calleez" appear on her terminal as the caller-id, along with additional information relating to the user of the electronic device, and recognize the nature of the emergency and be trained to respond accordingly. Broadly, this identification data may be referred to a security program communication identifier, such as Calleez may be transmitted as identification data that allows an emergency response communication to be quickly and easily identified Other aspects of the present disclosure may provide for more than one safe word to be used on the electronic device. That is, the security program operating on the electronic device may include logic or instructions to permit the user of the electronic device to program or store multiple safe words and assign different predetermined response measures to each safe word. Each safe word may be assigned based on the specific nature of the emergency situation (e.g., assault, robbery, injury, fire, and so forth) and the predetermined response measures may be different for each type of emergency situation, or the same. For example, the present disclosure may permit the user of the electronic device to record a first safe word for an emergency situation involving a personal injury. When the user speaks the first safe word, the security program operating on the electronic device launches a first set of predetermined response measures. The user of the electronic device may record a second safe word for an emergency situation involving a crime (e.g., assault or robbery). When the user speaks the second safe word, the security program operating on the electronic device launches a second set of predetermined response measures. As would be understood, the application may permit the user to record any number of safe words and associated response measures.

Referring now to FIG. 1, shown therein is an exemplary method implementing certain aspects of the present disclosure. Provided is a method of monitoring and responding to an emergency situation. The method may include analyzing 105, via a speech recognition module, the words or phrases spoken by a user of the electronic device. The method may further include determining 110, based on the words or phrases spoken by the user of the electronic device, if the user has spoken a predetermined safe word. The method may further include activating 115, if the user has spoken the predetermined safe word, a predetermined response measure on the electronic device. The method may be implemented via a security program operating on the electronic device or remotely on an application server. The safe word may be indicative of the nature of the emergency situation. The response measure may include transmitting audio and/or video to predetermined recipients. The response measure may include placing a call to a predetermined recipient.

In accordance with other aspects, the present disclosure may provide for a personal security system for a user of an electronic device. The security system may include a security program stored in computer-readable medium on an electronic device and executable by a processor of the electronic device, wherein, when executed, the program causes the electronic device to monitor for a user of the electronic device to speak a safe word and launch, in response to detecting the safe word, a predetermined response measure on the electronic device. The safe word may be indicative of an emergency situation of the user. The security program may provide for the user of the electronic device to record and assign multiple safe words wherein each safe word is indicative of a different type of emergency situation.

Figure 2:
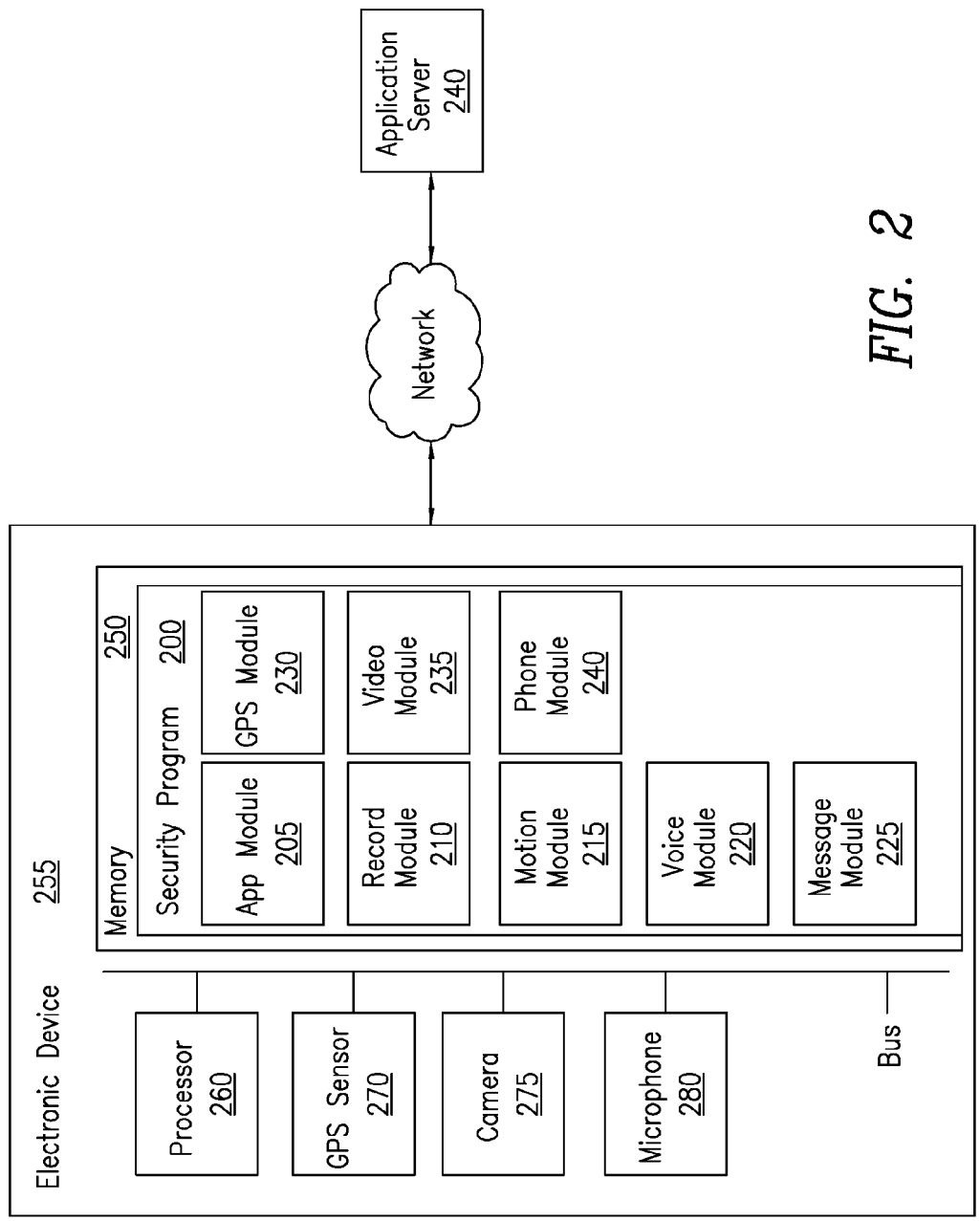
FIG. 2 is a schematic diagram of an exemplary electronic device having a security application, communicatively coupled to an application server via a network.

Referring to FIG. 2, certain aspects of the present disclosure may provide for the security program (e.g., Calleez) implementing aspects of the present disclosure to be launched in a variety of ways. Certain aspects may provide for the security program to operate at the Operating System (OS) level of the electronic device in order to ensure that the program is continuously active and monitoring for the user to speak the safe word at any time. When the electronic device is initially turned on or reset, the security program may automatically launch or be otherwise activated so as to begin monitoring for the user to speak the safe word indicating an emergency situation has arisen.

Other aspects may provide for the security program to be launched or otherwise activated by the user pressing one or more keys, switches, and so forth on the electronic device. As would be understood, certain electronic devices operate on batteries and, in order to conserve and extend the life of the battery, it may be beneficial for the security program to be adapted to permit the user to launch the program on an as needed basis. For example, the user of the electronic device may find herself in a situation that, while not an emergency, raises concerns that an emergency situation is about to occur, e.g., walking to her car late at night in a poorly lit parking garage. In such a situation, the user may activate the security program by pressing keys or switches on the electronic device as they enter the garage or before leaving her office in order to be prepared for any emergency that may arise. Once safely in her car, the user may then deactivate the security program by again pressing certain keys or switches on the electronic device. As another example, the security program being implemented on a computer used by a teller at a bank may be adapted to permit the teller to activate the program by pressing certain keys on the keyboard when they observe individuals approaching or entering the bank that appear to intend harm or otherwise raise an alarm to the teller. The security program may be adapted to be launched when the user presses certain key(s), activates predetermined switch(s), presses a dedicated key/switch on the electronic device, on an as needed basis, e.g., pressing the CTRL-S key. Again, the user may deactivate the security program once they are comfortable that the potential emergency situation has passed.

Referring to FIG. 2, the security program 200 may include, or be implemented using a variety of modules. A module (or application), as referenced in the present disclosure, should be generally understood as a collection of routines that perform various system-level functions and may be dynamically loaded and unloaded by hardware and device drivers as required. The modular software components described herein may also be incorporated as part of a larger software platform or integrated as part of an application specific component. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

As shown in FIG. 2, the security program 200 may include an app module 205, a record module 210, a motion module 215, a voice (audio) module 220, a messaging module 225, a GPS module 230, a video module 235, and/or a phone module 240. Generally, said modules operate to carry out at least a portion of the presently disclosed inventive concepts. It will be understood that the security program 200 may be referred to as "logic" that is stored in a memory 250 of an electronic device 255. The electronic device 255 further comprises a processor 260 that executes the logic stored in memory 250. Further details regarding additional components or functional aspects of an exemplary electronic device are described with regard to FIG. 3, which illustrates an exemplary electronic device 300, although it will be understood that the electronic device 255 comprises a particular purpose machine that has be programmed to execute the functionalities described with regard to the security program 200.

In some embodiments, the app module 205 may generally include logic, instructions, and the like to communicate with and operate on the electronic device 255 or remotely on an application server 280. As discussed, the app module 205 may operate at the O/S level of the electronic device 255 in order to load on initial power-up of the electronic device 255 to continuously monitor for the user to speak a safe word. The app module 205 may also be launched on an as needed basis and remain fully functional in its monitoring and communications capabilities even when the app module 205 is not the foreground on the mobile device 255 or when the display of the mobile device 255 is turned off or is in a mode intended to restricted access by unauthorized users. The app module 205 may include instructions and the like to operate as the core module of the security program 200 and be in communications with the other modules to carry out the present disclosure. The record module 210 may be in communication with one or more storage mediums on the electronic device 255 and include logic instructions to control the recording of inputs or data from, e.g., the microphone, camera, GPS sensor, and so forth, during an emergency situation. The record module 210 may further be in communication with the other modules to permit recovery and transmission of the recorded inputs or data to recipients as part of the response measures.

The motion module 215 may be in communication with any of the position sensors discussed above (e.g., accelerometer, INS, and so forth), or with other applications or dedicated programs operating on the electronic device 255. The motion module 215 may receive motion data inputs indicative of the motion of the electronic device 255. The motion module 215 may provide the motion data inputs to one or more of the other modules of the security program. The voice module 220 may include a speech recognition logic or be in communication with a separate speech recognition application or program operating on the electronic device 255 or remotely on an application server 280 and receive inputs indicative of the words being spoken by the user of the electronic device 255 in order to analyze said words using voice recognition algorithms. Generally, the voice module 220 may analyze the words or phrases spoken by the user of the electronic device 255, using speech recognition, to determine if the user has spoken the safe word. The voice module 220 may output data that indicates that the user has spoken a safe word. In accordance with other aspects, the voice module 220 may, during an emergency, activate the microphone on the electronic device 255 in order to record and transmit surrounding audio.

The messaging module 225 may include logic instructions to compose, generate, and/or communicating with other modules so as to transmit one or more messages to predetermined recipients once an emergency situation has been detected. The messages may be in any one or more of the herein described messaging formats (e.g., email, SMS, IM, and so forth). The messages may include information, data, text, and so forth, such as discussed herein.

In accordance with certain aspects, the voice module 220 may further me adapted to detect a user screaming, yelling, and/or other such noises and, utilizing this detected information, determine when an emergency situation has occurred. That is, the voice module 220 may detect when the user's voice has exceed a predetermined decibel level. Additionally, the voice module 220 may be configured to determine the difference between a scream and another high volume sound such as a cheer or a whistle. That is, the voice module 220 may be configured to consult voice patterns or other reference information that allows the voice module 220 to determine characteristics of the sounds that are evaluated by the voice module 220. The voice module 220 may evaluate any sound that exceeds the predetermined decibel level to determine if the sound is indicative of distress by the user.

In some instances, the voice module 220 may trigger an emergency response when the user exceeds the predetermined decibel level, especially after the voice module 220 has previously detected that the user has spoken a safe word.

Additionally, the voice module 220 may include data, instructions, and the like to determine which user has spoken the safe word, screamed, and so forth For example, the voice module 220, locally or remotely, may include voice identification data, algorithms and the like configured to analyze the auditory patterns being generated by the user, or someone else near the user, so as to provide a positive confirmation of who has spoken the safe word, screamed, and so forth In certain aspects, the voice module 220 and/or electronic device 255 may be configured to transmit the voice of an attacker to a remote system, such as the application server 280, which determines the identity of the attacker by comparison against voiceprints. The identity can be transmitted to the police/emergency contact with the initial contact or later.

Additionally, the electronic device 255 may also trigger other systems to activate within in the area, such as a house, car, office, and so forth. The other systems may have cameras, microphones, infrared cameras, pressure sensors (to detect location or weight), and the information may be sent to other systems for identification, storage or to emergency contacts.

The GPS module 230 may be in communication with a GPS sensor 270 on the electronic device 255 or with a separate application or program residing on the electronic device 255 and may include logic instructions adapted to permit the security program to receive location data indicative of the geographic location of the electronic device 255. The GPS module 230, using such location data, may record and/or transmit the location of the electronic device 255 to recipient(s) during an emergency situation. The video module 220 may be in communication with a camera 275 on the electronic device 255 and include logic instructions configured to capture, record, and/or transmit photographic images and/or video received from the camera 275 to recipient(s) during an emergency situation. The electronic device 255 may be configured to transmit images to the application server 280 that is adapted to identify an attacker by comparison to other pictures. The identity can be transmitted to the police/emergency contact with the initial contact or later.

The phone module 240 may be in communication with a communications module on the electronic device and include instructions configured to place call(s) to predetermined recipients during an emergency. As also discussed, the phone module 240 may be in communications with one or more other applications operating on the electronic device in order to place the call over, for example, the Internet. In one example, the phone module 240 may be in communication with an application configured to place a call over the Internet using, e.g., VoIP protocols. One exemplary VoIP application that the phone module may be in communication with and utilized to place the emergency call is Skype®. The phone module 240 may also be configured to control operations of the electronic device 255 to allow for the app module 205 to place the electronic device 255 into stealth operation mode. That is, the phone module 240 may control the hardware drivers of the electronic device 255 that control, for example, screen activation and brightness, as well as microphone or speakerphone control and muting, as well as other functions that provide indications of use of the electronic device 255 that may be detected by an assailant.

As discussed, the security program 200 may receive data from a microphone 280 of the electronic device 255 and utilize a speech recognition program to determine if the user of the electronic device 255 has spoken the safe word. The speech recognition program may be implemented as a part of the security program (e.g., the voice module) or may be a separate program residing on the electronic device wherein the security program is in communication with the speech recognition program. Further, the security program 200, upon initial power-on, may be in electrical communication with the one or more sensors on the electronic device 255 to receive data therefrom. Other aspects may provide for the sensors on the electronic device 255 to be in communication with one or more dedicated programs on the electronic device 255 wherein the dedicated programs are configured to receive and analyze data from the sensors. In that instance, the security program 200 may be configured to communicate with the dedicated programs in order to receive data indicative of the sensor outputs.

With more particular regard to the electronic device 255 being used to implement at least a portion of the disclosed security system and method, the electronic device 255 may include, but is not limited to a smart phone (e.g., an iPhone®, a blackberry, and so forth), an iPod Touch®, an iPad®, portable e-Reader, a personal computer, a portable game player, a portable music player, a game console, a laptop, a netbook computer, a television set, and the like. The electronic device may include internet network access capabilities via one or more of a cellular telephone network (voice and/or data), a WiFi access point, a wired network port, and the like. Certain aspects may provide for the electronic device 255 to include telephony access, such as the smart phone, wherein the electronic device includes a communication system configured to communicate via a cellular telephone network and/or via local Telco providers (e.g., landline). Other aspects may provide wherein the electronic device 255 does not include telephony access but is otherwise configured to communicate via a local area network, a wide area network, the Internet, a wireless network, an optical network, and the like. The electronic device 255 communicating via said network(s) may transmit and/or receive data or text messages as well as place voice and/or video calls using, for example, Voice Over IP (VoIP) protocols (e.g., Skype®).

Figure 3:
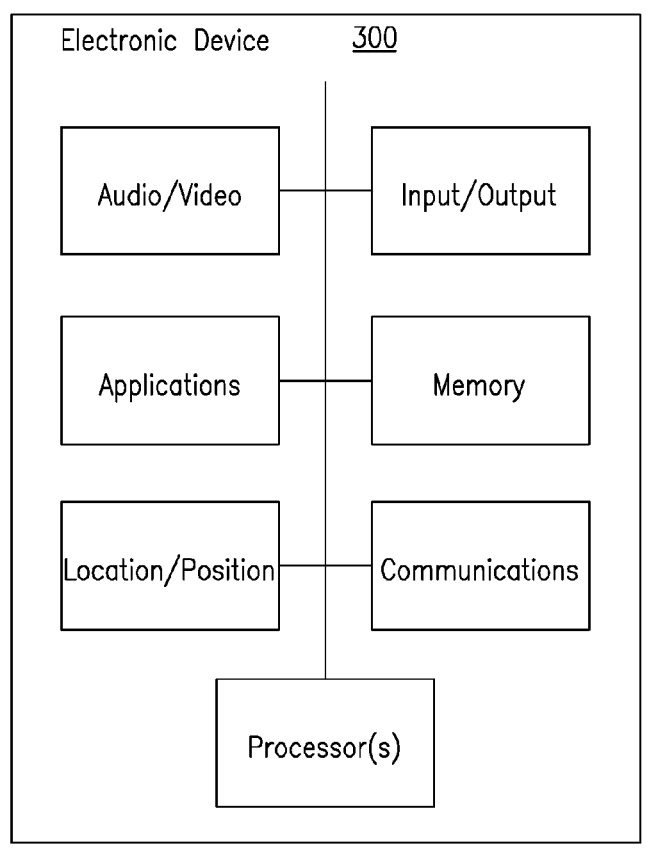
FIG. 3 is a schematic diagram of another exemplary electronic device constructed in accordance with the present disclosure.
Figure 4:
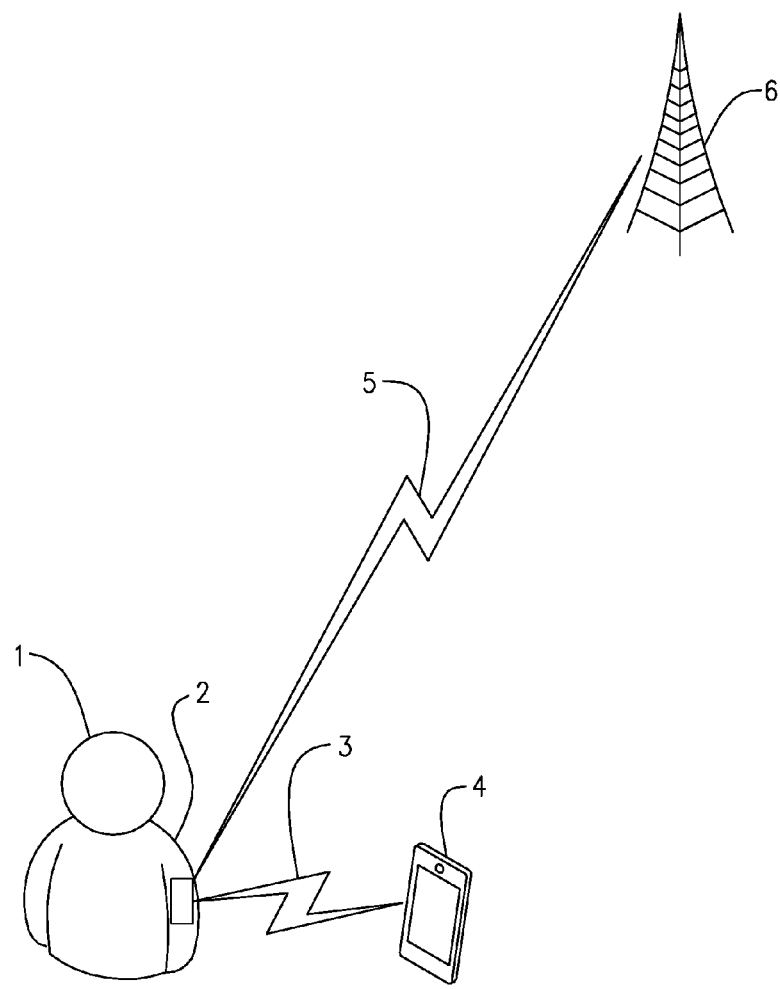
FIGS. 4-10 collectively and individually illustrate various embodiments of exemplary arrangements that include an electronic device having a security application thereon.
Figure 5:
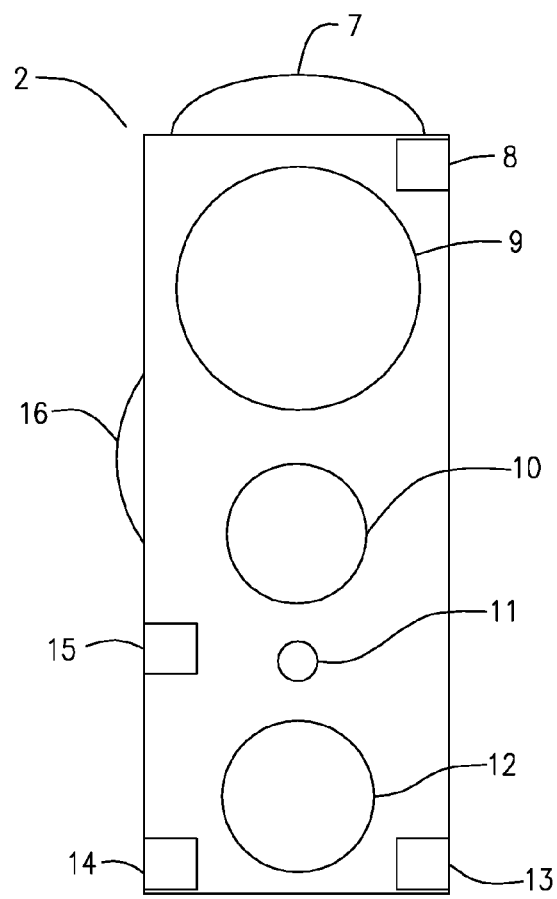
Figure 6:
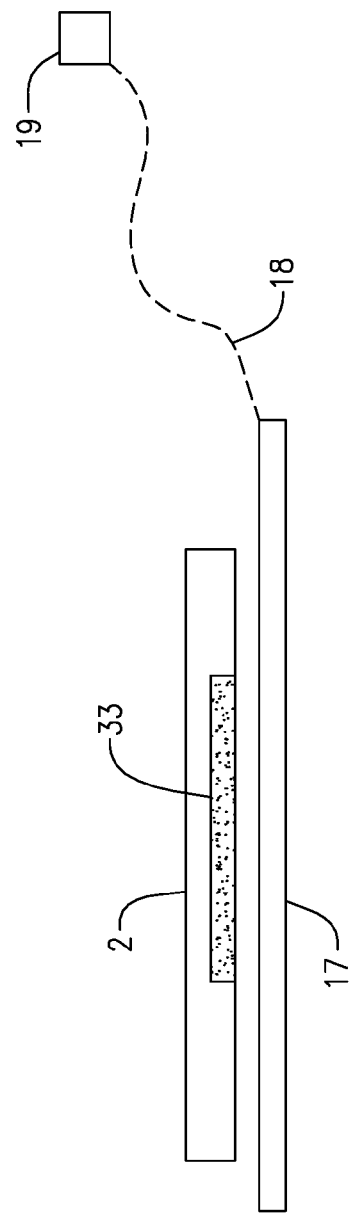
Figure 7:
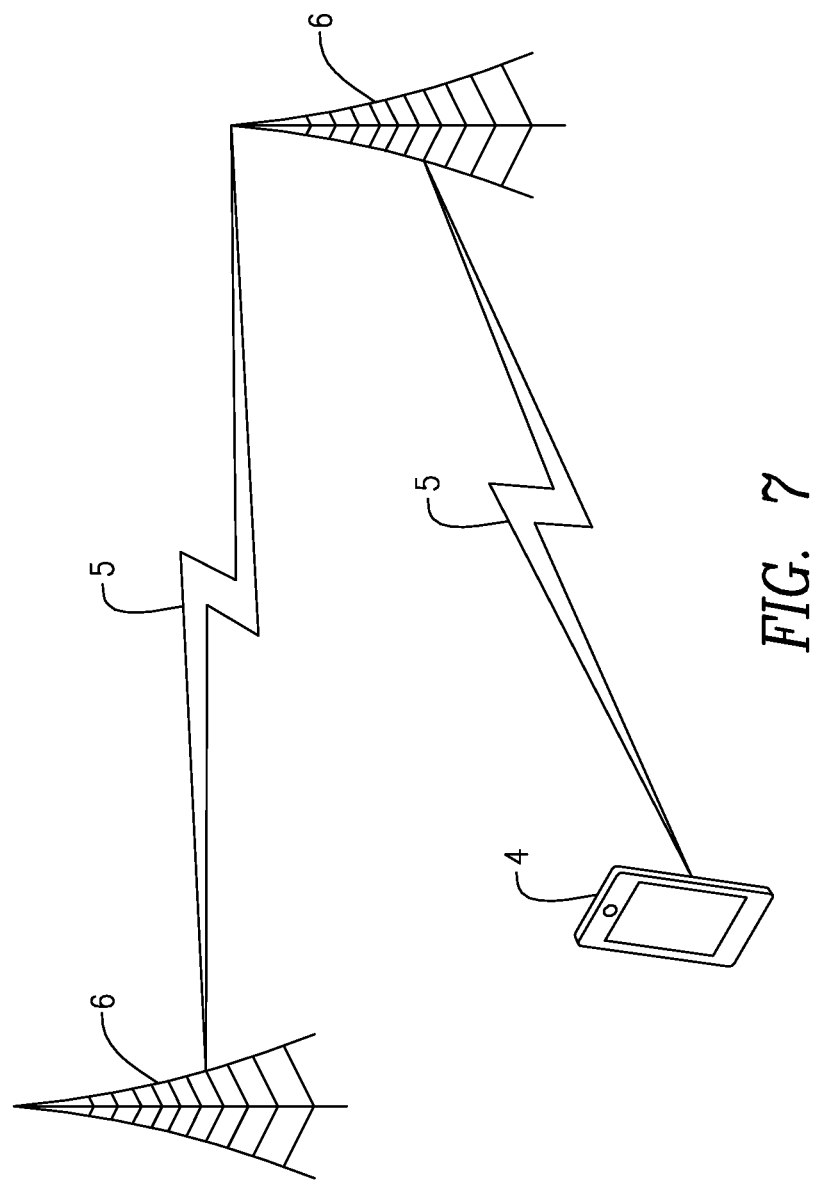
Figure 8:
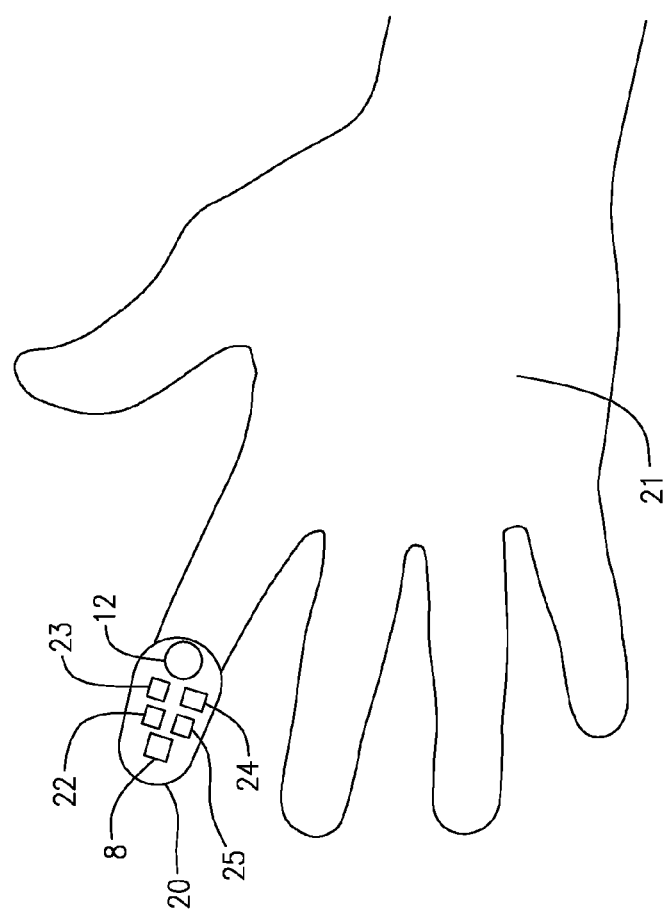
Figure 9:
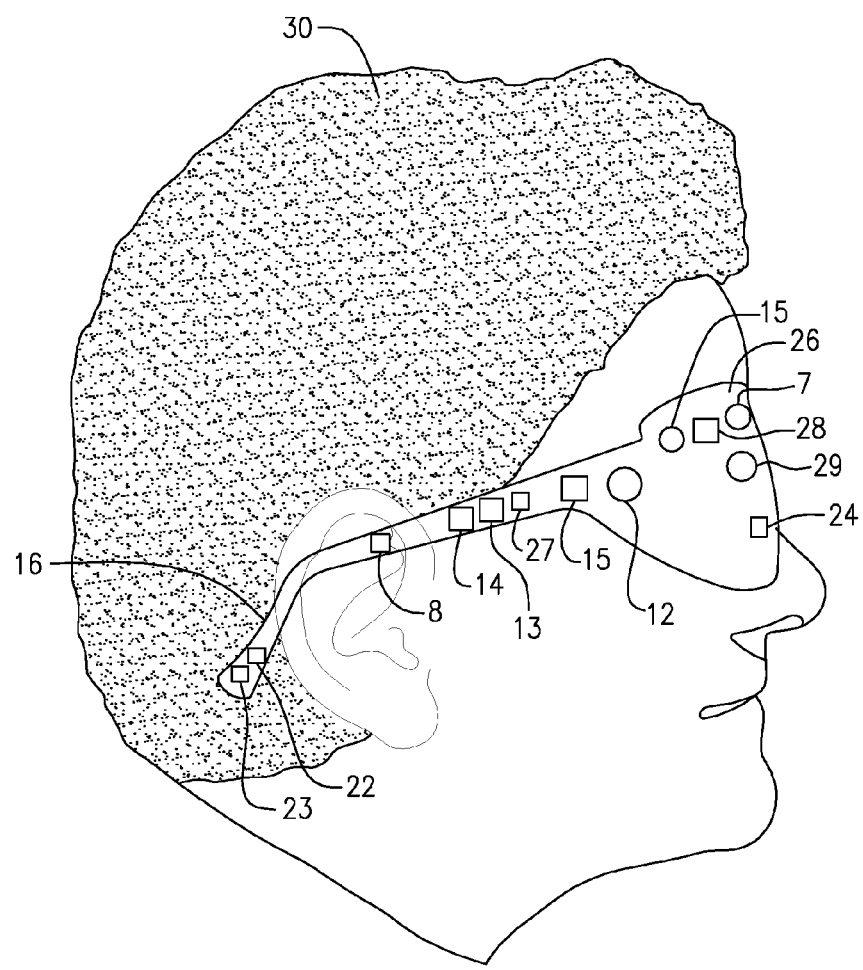

Turning now to FIG. 3, shown therein is an exemplary electronic device 300 constructed in accordance with the present disclosure. This device 300 includes an exemplary embodiment of the electronic device 255 of FIG. 2. Generally, the electronic device may include an audio/video component, an applications component or module, a location/position component, a communications component, a memory component 325, an Input/Output (I/O) component, and one or more processors, wherein said components are in electrical communication and transfer information/instructions via a data bus. The audio/video component may include a microphone, a camera, or similar sensor, as well as logic, hardware, or combinations thereof configured to capture audio and/or video and to provide AV data output(s) including information indicative of said captured audio and/or video. In exemplary embodiment, the electronic device may include one or more microphones and/or cameras positioned at various locations around the electronic device (front and back) wherein the multiple sensors may each provide said AV data output. The audio/video component may further include logic, hardware, or combinations thereof configured to analyze, differentiate, and/or combine the AV outputs from the multiple sensors and to provide the AV data output in a format adapted to provide a comprehensive view of the environment surrounding the electronic device. The audio/video sensors may capture and provide AV data indicative of sound and/or images associated with the environment proximate to the electronic device.

The applications module may include logic, hardware, or combinations thereof, configured to implement or execute a plurality of applications residing on the electronic device or remotely on an application server. The applications module may include one or more programs, applications, logic instructions, and/or computer executable code adapted to operating the electronic device. Exemplary applications include the herein disclosed security program, operating system programs, messaging programs, and the like. The programs being executed via the applications module may reside in a memory portion of the applications module or reside in the memory component. The applications module may be in communications with the memory component via, for example, the data bus, in order to transfer and/or store data or instructions associated with the applications for execution.

The location/position component may include, for example, the GPS sensor, accelerometer, INS, and the like, such as discussed above. The location/position component may include logic instructions, hardware, and the like configured to receive data inputs from said sensors wherein the data includes information indicative of the location, position, orientation, and so forth, of the electronic device. The location/position component may output location data indicative of the location, position, orientation, and so forth, of the electronic device. The location data may be output via, for example, the data bus and may be received by the applications module executing the security program.

The communications component may include logic, hardware, and the like, configured to permit the electronic device to communicate on a variety of communications mediums. Exemplary communications mediums may include, but are not limited to, a cellular telephone network (voice and/or data), a wireless network (e.g., WiFi), a wired network, the Internet, an optical network, and so forth The communications component may be in electrical communications with any of the other components of the electronic device via, for example, the data bus. Certain aspects may provide for the communications component to be configured to prepare (e.g., compose, formulate, arrange, and so forth) information or data in a manner required by the communications medium it is operating on so as to be transmitted thereon. Further, the communications component may receive information via the communications medium and provide the received information to one or more other components of the electronic device, e.g. the applications module executing the security program.

The memory component may include logic, hardware, the like configured to store information, data, programs, and so forth, to be executed by the electronic device. The memory component may store, for example, the applications or programs, operating protocols, and the like, as well as a variety of other processing system parameters, as would be understood in the art. The memory component may include a mass storage device and portable storage mediums. The memory component may be implemented via a magnetic disk drive, an optical disk drive, a solid-state disk drive, and so forth The memory component may be implemented via non-volatile storage device for storing data and instructions.

The I/O component may include logic instructions, hardware, or combinations thereof adapted to permit a user of the electronic device to operate, interface, or otherwise control the electronic device. Exemplary I/O devices may include, but are not limited to, a keyboard, a virtual keyboard, a mouse, a virtual pointing device, a monitor or display, a pointing device, a printer, a scanner, switches, buttons, and so forth, or combinations thereof.

The one or more processor(s) component may include logic instructions, hardware, or combinations thereof, adapted to generally operate the electronic device. The processor component may, for example, receive and/or execute instructions relating to the operating system of the electronic device. Certain aspects may provide for the processor component to receive and execute instructions from the security program in order for the electronic device to implement at least a portion of the herein described inventive concepts.

Other aspects may provide for the electronic device to include a unique identification number wherein the security program may transmit said identification number to the predetermined recipients as a part of the predetermined response measure.

Exemplary identification numbers that can be associated with each electronic device include, but are not limited to, a telephone number, an Electronic Serial Number, a Media Access Control (MAC) address, an Internet Protocol (IP) address, a Unique Device Identification (UDID) number, an International Mobile Equipment Identity (IMEI), and the like.

As would be understood in the art, the unique identification number associated with each electronic device can be used in a variety of ways to identify the electronic device as well as information associated with the user of the electronic device. The identification number may also be transmitted to the recipient(s) during an emergency as a part of the identification data discussed above.

Other aspects may provide for the electronic device to include infrared sensors and further be configured to transmit information indicative of the number of individuals within a predetermined distance from the electronic device. Other sensors may also be used to determine the number of individuals near the electronic device, e.g., a camera in conjunction with facial recognition program to locate and identify each person, a microphone identifying and distinguishing different persons voice patterns, and so forth Information indicative of the number of individuals within the predetermined distance may be transmitted as a part of the response measures.

Other aspects may provide for the electronic device to be configured to determine and/or store the layout of the facility it is located in, e.g., the room layout of a house, and further to transmit information indicative of where in the facility the electronic device is located as a part of the response measures. For example, the camera, the proximity sensors, GPS sensors, infrared sensors, and the like may individually or collectively be adapted to determine the location of walls, doors, windows, and the like within the structure. Information indicative of the layout may be stored and accessed, in cooperation with any of the location sensing systems discussed herein, so as to monitor and record where within the facility the electronic device is located. Once an emergency situation has been detected, information indicative of where the electronic device is located, and by extension the user, may be transmitted to, for example, emergency response personnel.

Other aspects may provide for ancillary components ("secondary devices") forming a part of the presently disclosed security system and method. In one embodiment, the system may include a secondary electronic device that may be carried on the person of the user and is in wireless communication with the primary electronic device that may be located proximate the user, but in a fixed location. The secondary device may be a wristwatch worn on the wrist of the user, a Bluetooth headset worn by the user, a pendant worn on the wrist, neck, or attached to the clothing of the user, integrated into a piece of jewelry (e.g., belt buckle) worn by the user, a hearing aid being worn by the user, incorporated into glasses worn by the user, and so forth In this instance, the primary electronic device may be positioned locally (e.g. in the same room, the same building, and so forth) to the user carrying the secondary device. As one example, the primary electronic device having the security program may be a desktop computer, a laptop computer, a point-of-sale terminal, a home assistant system, a television, and the like, wherein the secondary device is being carried by/worn on the user. In another embodiment, the primary device may be incorporated into a smoke alarm wherein such smoke alarms are located in each room of a building. As would be understood, the primary device may establish communication with each, or at least one user entering the room so as to monitor for the user to speak the safe word to indicate an emergency situation has arisen and to initiate the response measures. The primary and secondary devices may also include the ability to operate on internal batteries that can be charged via a wired connection or using inductive charging. Inductive charging may be performed using an inductive coupling component 33 contained within the device 2, an inductive mat 17 connected to a standard outlet mounted charging device 19 via a cable 18.

The primary and secondary devices may be in communication via, for example, Bluetooth, Infra-Red, or other wireless communication medium. In other aspects, the primary and secondary devices may be in communication via one or more interconnected or network environments, e.g., via a wireless network, a wired network, the Internet, and the like. In one exemplary embodiment, the secondary device may include a microphone and/or camera wherein the security program operating on the primary device receives input from the secondary device so as to monitor for and detect when an emergency situation has occurred. Once the primary device determines that the emergency has occurred, the electronic device may initiate the response measures in accordance with the inventive features described herein. In this exemplary embodiment, the primary and secondary device may be in communication via the Internet.

While the present invention has been described in connection with a series of preferred embodiments, these descriptions are not intended to limit the scope of the invention to the particular forms set forth herein. The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents. The present descriptions are intended to cover such alternatives, modifications, and equivalents as may be included within the spirit and scope of the invention as defined by the appended claims and otherwise appreciated by one of ordinary skill in the art. In several respects, embodiments of the present invention may act to close the loopholes in the current industry practices in which good business practices and logic are lacking because it is not feasible to implement with current resources and tools.

The components provided in the electronic device 300 of FIG. 3 are those typically found in computing systems that may be suitable for use with embodiments of the present invention and are intended to represent a broad category of such computer components that are well known in the art. Thus, the computing system 300 of FIG. 3 may be a personal computer, hand held computing system, telephone, mobile computing system, workstation, server, minicomputer, mainframe computer, or any other computing system. The computer may also include different bus configurations, networked platforms, multi-processor platforms, and so forth Various operating systems may be used including Unix, Linux, Windows, Macintosh OS, Palm OS, Android, iPhone OS and other suitable operating systems.

FIGS. 4-10 illustrate various embodiments of electronic devices that implement various modules described supra with respect to FIGS. 1-3. Many of these embodiments involve the use of mobile electronic devices. Before describing the embodiments in greater detail, a list of definitions pertinent to the descriptions will be discussed initially. Protectee: 1 the user of the mobile electronic devices/sensors. Safety Buddy: an individual defined by the protectee to offer assistance in the event of a safety incident or emergency. Safety buddies are users of the security system, but are unmonitored unless they are also registered as protectees.

Security system (or application): Is always active (foreground, background) and is a monitor, personal protector, emergency, medical, or location, and so forth, application that alerts when described actions are taken. Network: a wired or wireless communications network inclusive of cell towers radio beacons, radio receivers, transmitters, transceivers, and wireless access points 6 (see FIGS. 1 and 4).

Social Network: safety buddies/individuals defined by protectees' (also referred to as Samaritans). Personal Network: a plurality of safety buddings/individuals defined by an individual protectee.

Mobile devices: shown in the FIGS. as sensors 2, 4, 20, 26, and 32, wireless communications devices 3 and 5 (e.g., beacons), smartphones 4, and wireless transceiver 8. Inputs/sensors: the system will monitor a variety of sensors and inputs on the protectee's mobile device/devices to determine signs of potential threats or distress. These inputs can include but are not limited to: audio 4 and 7, ultrasonic transducer 16, camera 31, GPS sensor 15, accelerometer 13, magnetometer (Compass) 14, Biometric apparel 20, 26, and 32, blood pressure sensor 25, galvanic skin response sensor 24, pulse sensor 22, oximeter 23, brain wave sensor 27, iris monitor camera 28, and wireless button 12.

Figure 10:
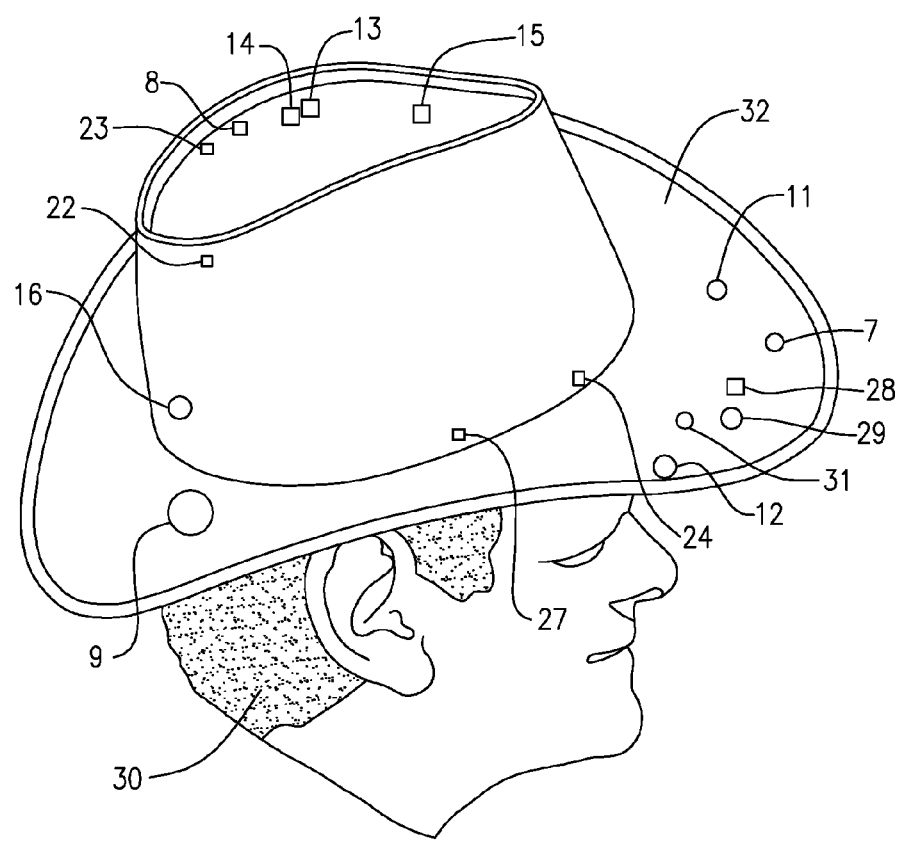

If the system detects a potential threat or distress from the protectee, the system will enter a triggering mode and create an incident alert that will be sent out to the protectee's Safety Buddies and potentially any other Safety Buddies in the vicinity (see FIG. 10). Multiple sensor input: The system can monitor one or more sensors simultaneously to detect potential threats and distress situations for the protectee. Audio: voice, speech recognition (keyword), loud noise (e.g., gun shot, glass breaking), scream, and voice stress. Ultrasonic transducer: sensor that a user can wear, the sensor would monitor objects and/or persons entering the protectee's blind spot (e.g., from behind). The system could then alert the protectee when a person or object is within a specified distance (e.g., 10 feet) or is approaching rapidly. These alerts can be done at the same time (e.g., when someone is approaching the protectee), a pulsating tone alert is sounded, and as the person gets closer the pulse interval decreases. If the person is approaching the protectee at a high rate of speed, the volume and pitch can dramatically increase.

Camera: can use the camera to detect faces, perform facial recognition, and examine facial expressions on people in close proximity to the protectee, to detect individuals that may be potential threats to the protectee. The camera can also be used to detect infrared heat signatures to differentiate people from other objects. The camera can also be used to detect a flash (e.g., muzzle flash from gun). Images captured by the camera could be used to provide an augmented reality view of the area around the protectee. This augmented reality could also be used in conjunction with GPS signals indicative of the location of the device. Augmented reality could provide the user an image of their current location on their smartphone with details overlaid on the images building, streets, landmarks, and so forth to highlight the safest areas, locate the safest direction to travel, the nearest emergency services facilities, and so forth.

A camera could also be used to monitor the protectee and determine their state of fear. As an example the camera can monitor the protectee's facial expressions and/or changes in their iris size to determine if protectee perceives a potential threat.

Accelerometer: It can be used to detect a high increase or decrease in acceleration (e.g., fall or crash). Bio-metric: biometrics sensors can monitor the protectee's body to measure stress levels and detect their perception of potentially hazardous situations. These can include but are not limited to sensors that measure: heart rate, blood pressure, brain waves, galvanic skin response, and blood oxygen levels (oximeter). Any combination of these could be used to trigger the system.

Pre-trigger Interval: avoid false alarms, provide feedback to user, sound, voice, pre-recorded message, blinking lights, vibration, user can turn this off if they are in a high threat area or the system can via geo-location. The security program will allow the protectee to defeat the triggering (an amount of time to react within e.g.: 30 seconds) if the triggering is incorrect. If the system detects another input during the pre-triggering period (e.g.: another noise or distress sound) the system will automatically trigger. Also, during the pre-triggering period the system can also increase the monitoring sensitivity and monitor other sensors (e.g.: accelerometer or trigger at lower sound threshold) to better determine if an incident is occurring and to provide additional data to Safety Buddies in the event the system continues to a triggering stage (see FIG. 9).

Output and feedback to user: The system can provide the user continuous feedback both prior to and during an incident. These can include but are not limited to mapping and route guidance, e-mails, text messages push notification, blinking lights 10, vibration, pre-recorded voice, augmented reality, heads up display/LCD display 29 wireless speakers 9, wireless strobe lights 10, and status light 11 (see FIGS. 2, 7, and 8).

Mapping and route guidance: provide safest route from a bad area, it also can detect that the protectee is entering a danger area and alert them. It can provide the Safety Buddies the location of the protectee as well as show the protectee the location of their Safety Buddies or other Safety Buddies in their area. On displayed maps detailed overlay can be generated to illustrate potential areas of threat and safety, for example, based on crime stats, location of safety buddies, police, and fire stations. Emails: The security system will provide emails to safety buddies and others that an incident has occurred. Text messages: The security system will provide immediate text messages to safety buddies and others that an incident has occurred. Push notification: When an alert is fired the security system will push notification to alert a safety buddies that an incident is occurring along with the location of the incident. Blinking light: The device will blink, pulsate the screen, camera light and other items such as camera flash. Vibration: the device will pulsate when application is fired. This can also warn the protectee that the application has been engaged and may allow them time to disarm a false alert. Pre-recorded voice and audio: Has the ability to play pre-recorded voice messages and other audio to alert protectees, safety buddies, authorities, or people in the general vicinity of an incident. VoIP: The system can have the capability to establish a Voice Over IP connection with Safety Buddies to enable voice communications quickly in the event of an incident. Augmented reality: Use of devise to help locate where you are. For example, the security program may use the camera, sound, video and GPS data. This data will provide and display more information regarding location, events, and crimes stats.

The security application may also provide other features and functions such as determining the location of other safety buddies. The security system has the ability to locate all defined safety buddies to push alerts that someone in their proximity is in need of help. The security application may also monitor signs of distress, several different sensors, wireless sensor, bio metric sensor glasses, biometric hand sensor phone, and so forth, can be triggered when a threat is determined by the protectee or a combination of data to the sensors.

The security application may also include the ability to triangulate a mobile device location using fixed position, or multiple mobile devices as well as the protectee mobile devise to locate and triangulate location. For example, the security application may locate someone in a school or business in the event of an emergency. The security application may also provide itinerary base monitoring that gives the system the ability to alert the protectee's safety buddies if and when the protectee is in a particular spot at a prescribed time or not at a spot at a prescribed time. Alert the protectee when they are near or about to enter a danger zone.

The security application may also provide the ability to leverage others that are not your safety buddy, but have the security system on their device and they can be alerted that someone within proximity of them is in danger.

The security application can be put into stealth mode so that the attacker is unaware that the security application has been executed. The security application may also implement a passcode that allows the protectee to disarm the security application if it was inadvertently set off. This may be done with a protectee secret code or specialized gesture or a combination of both or similar methods. The security application may also provide a deactivation mode. If the security application is turned off the application will alert the appropriate protectee that the application is off. The security application may also interact with biometric sensor devices that can be worn on the hand 21, head 30 or clothing, pocket books and so forth (see FIGS. 6, 7, and 8). These sensors will alert safety buddies that protectee is in distress. The security application may also inform users of a danger zone, which is an area where there is a higher rate of criminal incidents. This data can also be obtained through the social safety network of protectee's. The protectee will have the ability to alert others of an area of higher risk that they may have experienced.

According to some embodiments, the security program may be configured to selectively adjust an emergency event threshold for the electronic device. For example, the security program may be configured to monitor the location of the electronic device, as well as temporal data, such as time of day or the day of the week. Location information may indicate that the user is in a safe or possibly dangerous area. As mentioned above, the security program may consult crime map data or other safety related information and compare the location of the user to such data. If the user is in a dangerous location, the security program may selectively adjust an emergency event threshold for the device. For example, assuming a normal operating mode would require that the user yell the designated Safe Word at a decibel level of at least 95 db. If the security program detects that the user is in a dangerous location, the security program may change this threshold level to only 80 db. It will be understood that the security program may selectively adjust any threshold type, whether it be volume related, accelerometer or velocity related, and so forth. Other instances where threshold adjustment may be appropriate may include a time of day where a user is more likely to be involved in an emergency situation, such as late at night. In some instances, the security application may utilize both location and temporal data, as well as any other types of data that would be known to one of ordinary skill in the art with the present disclosure before them.

The security program may selectively adjust the threshold levels for emergency events on a continual basis, even when monitoring one or more sensors to collect auditory, visual, and bio-metric data received by the electronic device as described above.

Thus, the security program may be configured to detect a sudden or a threshold exceeding change relative to the emergency event threshold, from an analysis of the collected auditory, visual, and bio-metric data. That is, the security program compares the sensor input to the selectively adjusted emergency event threshold. If the security program detects a sudden or threshold exceeding sensor input, the security program activates a predetermined response measure on the electronic device if a sudden or threshold exceeding change is detected.

Figure 11:
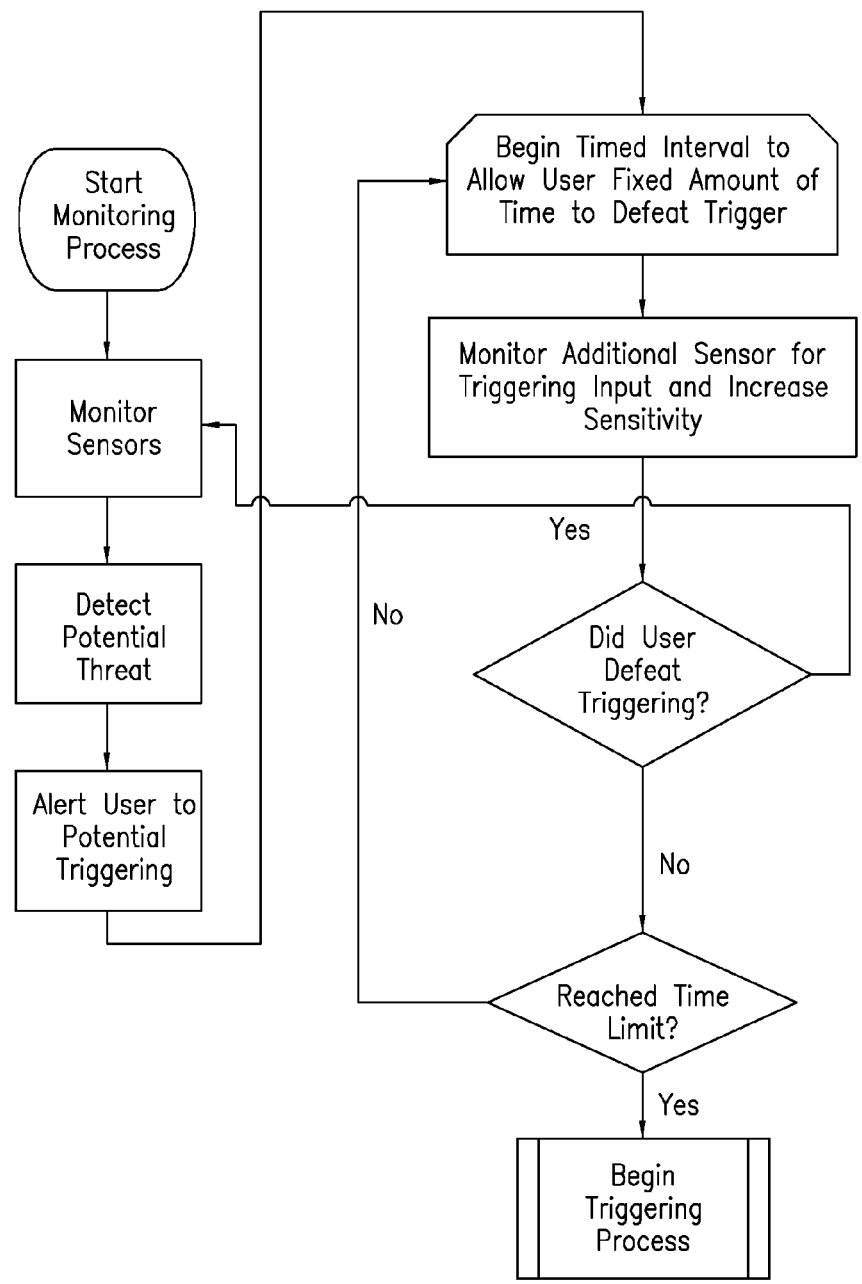
FIG. 11 is a flowchart of another exemplary method for activating a response measure on an electronic device in response to an emergency situation.

FIG. 11 illustrates an exemplary method for activating a response measure on an electronic device in response to an emergency situation. Notably, the method proceeds similarly to the method of FIG. 1, with additional steps, such a allowing the user a fixed amount of time to defeat a trigger. That is, if the user does not deactivate the trigger, it can be assumed that the trigger was executed in response to an actual emergency situation. The step of allowing a fixed amount of time is optional. If this option is selected, the device continues monitor the additional sensors or triggering inputs. The security application may also increase the sensitivity of the sensors.

Figure 12:
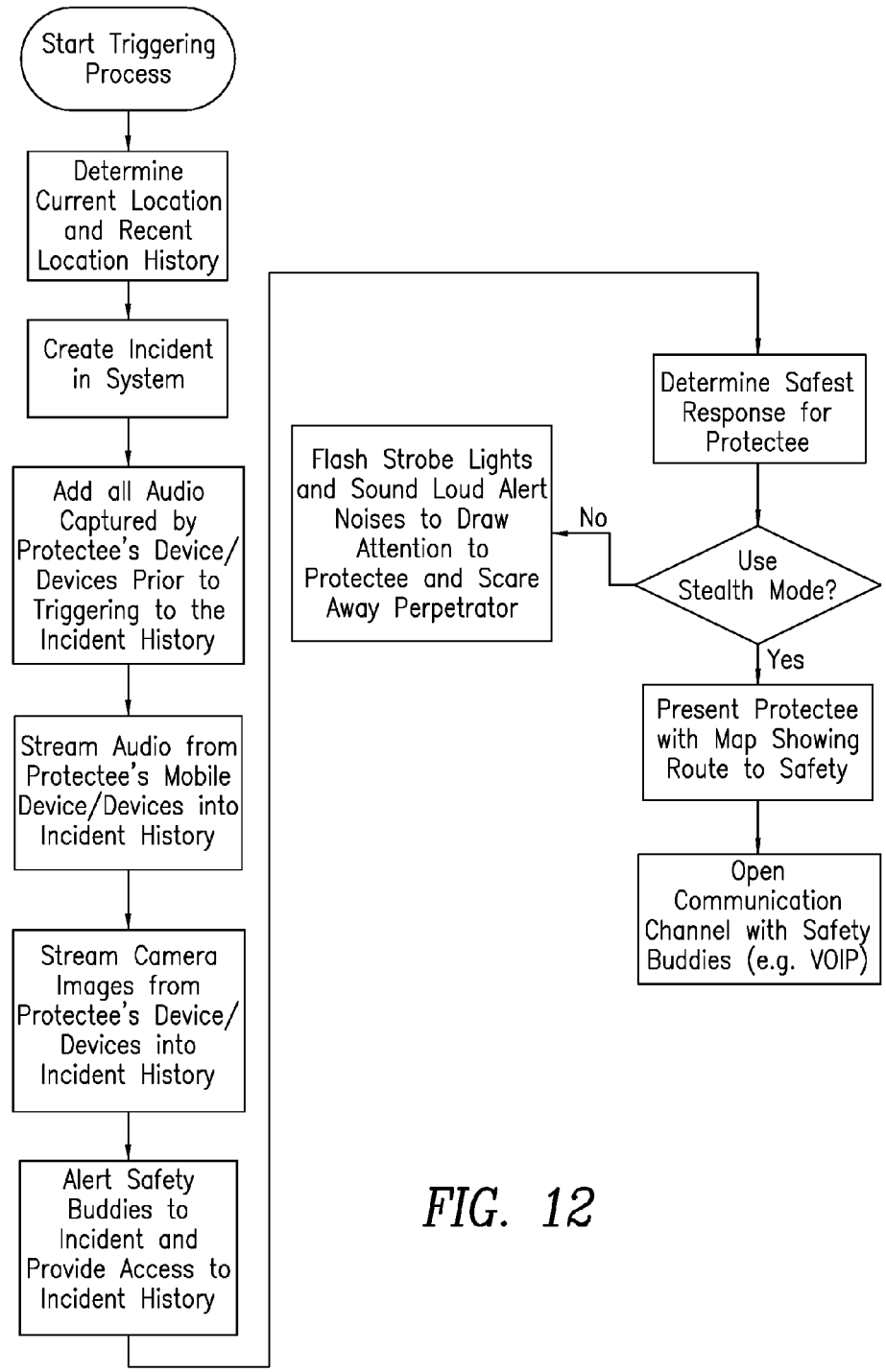
FIG. 12 is a flowchart of yet another exemplary method for activating a response measure on an electronic device in response to an emergency situation.

FIG. 12 illustrates an exemplary method for activating a response measure on an electronic device in response to an emergency situation. More specifically, the method of FIG. 12 is an exemplary process that executes after an emergency event has triggered a predetermined response. Initially, the security program may determine a current location and recent location history for the electronic device and create an incident record in the system. This record may be stored on an application server with which the electronic device is communicating. It will be understood that this information may be transmitted in either a synchronous or a synchronous manner.

Next, the security program causes all audio captured by the device prior to triggering of the event to the incident record. Also, the security program may stream audio from the device into the incident record. In some instances, the security program may stream camera images to the incident record and alert safety buddies to the incident. In some instances the security program may allow those buddies access to the incident record.

The security program may also determine an appropriate response for the user, based upon the type of emergency situation. For example, the security program may determine if police, fire, or another emergency responder type should be called, based upon the event. If there is a shooting, the security program may immediately contact the police. If the emergency event is a fire, the security program may contact the fire department first.

The security program may also determine if the electronic device should be put into stealth mode. If so, the security program may provide open communication with buddies and/or present the user with a map showing a route to safety. If the emergency situation does not require stealth mode, the security program may execute various features such as a strobe or loud noise to draw attention to the user.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents

What is claimed is:

1. A method for activating a response measure on an electronic device, the electronic device comprising a processor and a memory for storing logic, the processor executing the logic to perform the method comprising:
    analyzing words or phrases spoken by a user using speech recognition;
    determining if the user has spoken a safe word from the analyzed words or phrases, the safe word indicating that the user is in an emergency situation; and
    activating a predetermined response measure on the electronic device if the user has spoken a safe word by transmitting a first unique identifier for the electronic device along with a security program communication identifier to an emergency responder, the security program communication identifier comprising a second unique identifier that identifies a security program executing on the electronic device.

2. The method according to claim 1, wherein the processor further executes the logic to perform operations comprising constantly listening for words or phrases spoken by the user.

3. The method according to claim 1, wherein the processor further executes the logic to perform operations comprising placing the electronic device into a stealth operation mode upon activating the predetermined response measure.

4. The method according to claim 1, wherein the processor further executes the logic to perform operations comprising storing a plurality of safe words for the electronic device, wherein each of the plurality of safe words comprises a predetermined response measure that is unique, such that the response measures for the plurality of safe words are different from one another.

5. The method according to claim 1, wherein the processor further executes the logic to perform operations comprising detecting when a sound made by the user has exceeded a predetermined decibel level.

6. The method according to claim 5, wherein the processor further executes the logic to perform operations comprising evaluating the sound to determine if the sound is indicative of distress by the user.

7. The method according to claim 1, wherein the predetermined response measure comprises recording any of audio, video, and location data of the electronic device and transmitting said recorded data to one or more recipients to alert them to the emergency situation.

8. An electronic device configured to activate a response measure in response to an emergency event, the electronic device comprising:
    a processor; and
    a memory for storing logic, the processor executing the logic to:
        analyze words or phrases spoken by a user using speech recognition;
        determine if the user has spoken a safe word from the analyzed words or phrases, the safe word indicating that the user is in an emergency situation; and
        activate a predetermined response measure on the electronic device if the user has spoken a safe word by transmitting a first unique identifier for the electronic device along with a security program communication identifier to an emergency responder, the security program communication identifier comprising a second unique identifier that identifies a security program executing on the electronic device.

9. The electronic device according to claim 8, wherein the processor further executes the logic to constantly listen for words or phrases spoken by the user.

10. The electronic device according to claim 8, wherein the processor further executes the logic to place the electronic device into a stealth operation mode upon activating the predetermined response measure.

11. The electronic device according to claim 8, wherein the processor further executes the logic to store a plurality of safe words for the electronic device, wherein each of the plurality of safe words comprises a predetermined response measure that is unique, such that the response measures for the plurality of safe words are different from one another.

12. The electronic device according to claim 8, wherein the processor further executes the logic to detect when a sound made by the user has exceeded a predetermined decibel level.

13. The electronic device according to claim 12, wherein the processor further executes the logic to evaluate the sound to determine if the sound is indicative of distress by the user.

14. The electronic device according to claim 8, wherein the predetermined response measure comprises recording any of audio, video, and location data of the electronic device and transmitting said recorded data to one or more recipients to alert them to the emergency situation.

15. An electronic device, comprising:
   a processor; and
   a memory for storing logic, the processor executing the logic to:
      analyze words or phrases spoken by a user using speech recognition;
      determine if the user has spoken a safe word from the analyzed words or phrases, the safe word indicating that the user is in an emergency situation; and
      activate a predetermined response measure on the electronic device if the user has spoken a safe word;
      determine location and temporal data for the electronic device;
      selectively adjust an emergency event threshold based upon at least one of the location and temporal data;
      monitor one or more sensors to collect auditory, visual, and bio-metric data received by the electronic device;
      detect a sudden or a threshold exceeding change relative to the emergency event threshold, from an analysis of the collected auditory, visual, and bio-metric data; and
      activate a predetermined response measure on the electronic device if a sudden or threshold exceeding change is detected.

\* \* \* \* \*